United States Patent [19]

Ferara

[11] 3,962,942

[45] June 15, 1976

[54] CUTOFF MECHANISM

[75] Inventor: James T. Ferara, Cherry Hill, N.J.

[73] Assignee: Molins Machine Company, Inc., Camden, N.J.

[22] Filed: Nov. 29, 1974

[21] Appl. No.: 528,385

[52] U.S. Cl. .................................. 83/311; 83/324; 83/343
[51] Int. Cl.² ...................... B26D 1/56; B23D 25/12
[58] Field of Search ............ 83/287, 288, 311, 324, 83/331, 343, 346, 593; 74/359, 360, 437, 665 C, 665 L, 665 M, 665 N

[56] References Cited
UNITED STATES PATENTS

| | | | |
|---|---|---|---|
| 2,180,203 | 11/1939 | Hallden | 83/311 |
| 2,670,796 | 3/1954 | Orr | 83/311 X |
| 2,933,940 | 4/1960 | Hallden | 74/437 |
| 3,424,041 | 1/1969 | Giraud | 83/287 X |
| 3,608,411 | 9/1971 | Schmidt | 83/311 X |
| 3,628,410 | 12/1971 | Shields | 83/287 |
| 3,745,865 | 7/1973 | Johnson | 83/324 X |

*Primary Examiner*—Othell M. Simpson
*Assistant Examiner*—Fred A. Silverberg
*Attorney, Agent, or Firm*—Seidel, Gonda & Goldhammer

[57] ABSTRACT

The cutoff mechanism repetitively cuts a moving web into sheets by at least one cutting blade movable in the direction of travel of the web at web speed at the instant of cutting. The cutting blade is controlled by a cyclic mechanism. The cyclic mechanism has a uniform input speed or a cyclic input speed. When the cyclic mechanism is driven with a cyclic input speed, the normal range of sheet length is doubled.

5 Claims, 3 Drawing Figures

CUTOFF MECHANISM

BACKGROUND OF INVENTION

Cutoff mechanisms for repetitively cutting a moving web into sheets of selectively variable lengths operate within a predetermined range. In the corrugated paperboard industry, most of the cutoff mechanisms used heretofore have had a range of about 200 inches for sheet length, with the maximum size sheet being 240 inches long.

The industry has always had a desire for a cutoff mechanism which could cut sheets within the normal range but could also cut sheets having a length much greater than that available. Recently, there has been a demand for a cutoff machine capable of selectively and accurately cutting a moving web into sheet lengths varying from about 24 inches to about 480 inches.

U.S. Pat. No. 3,745,865 discloses a cutoff mechanism having a variable cyclic mechanism so that a moving web may be cut into sheets having lengths from about 22 inches up to about 240 inches. U.S. Pat. No. 3,628,410 discloses a device for extending the sheet length beyond 240 inches by providing a web length counter and a stop-start mechanism whereby the cutoff is inoperative for a period of time during which a predetermined length of the web is advanced.

The present invention is directed to apparatus for repetitively cutting a moving web into sheets by means of a cutting blade movable in the direction of travel of the web at the speed of the web at the instant of cutting. The cutting blade is mounted on a rotatable support and driven by a cyclic mechanism selectively adjustable for the length of sheets to be cut from the web. The cyclic mechanism is driven by a main drive shaft. A driving motor is connected to the main drive shaft through a variable speed drive.

The present invention preferably includes a selectively operable transmission whereby the main drive shaft may be driven at a uniform speed or at a cyclic speed. When the drive shaft is driven at a cyclic speed the period of the cutting blade is extended so that the interval between cuts is longer. A longer period permits a greater length of web to pass through the apparatus between cuts and a proportionately longer sheet may be cut without an interruption in the motion of the blade. The addition of the present invention to conventional cut-off machines doubles the maximum length sheet which may be repetitively cut from a continuously moving web.

One aspect of the present invention is the advantage, in some circumstances, of being able to rapidly change from one sheet length to another. With a conventional machine having a uniform speed input to the cyclic mechanism, it could take as long as 30 seconds to change from a sheet length of 40 inches to a sheet length of 100 inches. With the present invention, it is only necessary to change from a sheet length of 40 inches to a sheet length of 50 inches and then flip a switch so that a cyclic input is transmitted to the cyclic mechanism to attain a sheet length of 100 inches.

It is an object of the present invention to provide a cutoff mechanism selectively operable in either of two modes with the second mode providing for a sheet length up to twice the sheet length attainable by the first mode.

It is another object of the present invention to provide a device which facilitates increasing maximum sheet length from about 240 inches to about 480 inches and which is adaptable for incorporation in new machines or for converting old machines.

It is another object of the present invention to reduce conversion time when changing from a set-up for one sheet length to a set-up for another sheet length.

Other objects and advantages will be set forth hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown in FIG. 1 a cutoff mechanism in accordance with the present invention designated generally as 10.

Figure 1:
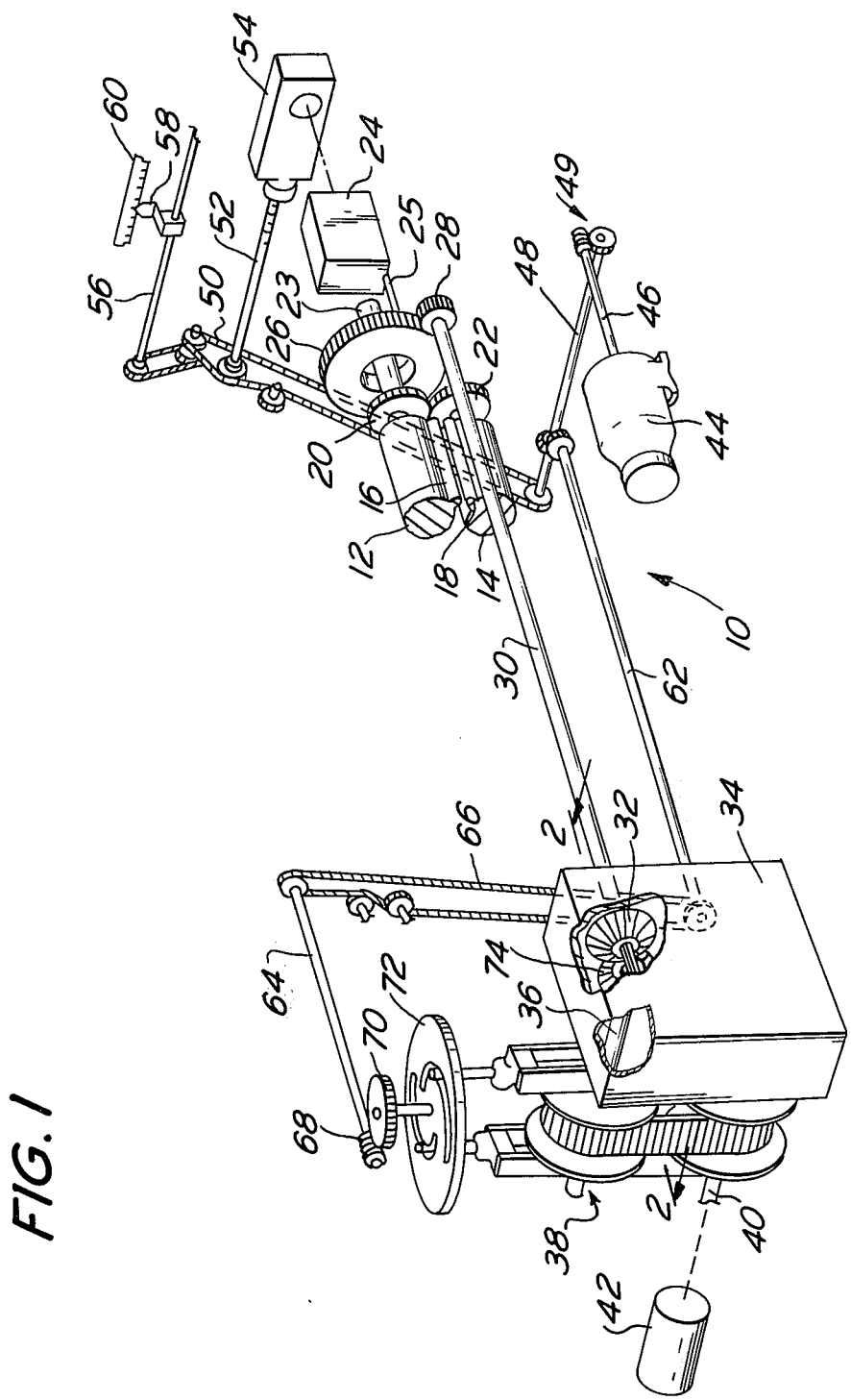
FIG. 1 is a diagrammatic illustration of the cutoff mechanism of the present invention.

The cutoff mechanism includes cylindrical supports 12 and 14 for the blades 16 and 18 respectively. While a pair of blades is utilized to effect a cutting action on the web, one blade and an anvil may be utilized. The supports 12 and 14 are coupled together by gears 20 and 22 so that they rotate in opposite directions.

One of the supports, namely support 12 is coupled directly to a cyclic mechanism 24 by way of a shaft 23. The cyclic mechanism 24 may be any one of a variety of cyclic mechanisms known to those skilled in the art and may include use of elliptical gears or may be of the crank and slider type as disclosed in U.S. Pat. No. 3,745,865.

An input gear 26 surrounds the shaft 23 and is coupled by way of member 25 to cyclic mechanism 24 to drive the same. Gear 26 meshes with a pinion 28 on the main drive shaft 30 which extends transversely across the machine.

The end portion of main shaft 30, remote from the pinion 28, includes a bevel gear 32 which is part of the transmission 34. The transmission 34 is connected to the output shaft 36 of a variable speed drive 38. Drive 38 is preferably a conventional Reeves drive having an input shaft 40 connected to a drive motor 42.

The drive 38 may be of the type corresponding to the variable speed transmission designated by the numeral 24 in U.S. Pat. No. 1,897,867. The function of the variable speed drive 38 or Reeves drive is to drive the cutting blades 16, 18 at a predetermined ratio of the speed of the web. The Reeves drive thus establishes the length of sheets cut from the web. The variable speed drive 38 includes two pairs of pulleys made of opposed conical discs provided with a belt therebetween for transmitting power. To change the speed ratio or the sheet length, one pair of cone discs is separated as the other pair converges, thus altering the effective diameters of the pulleys and the ratio of the knife speed to web speed.

The cyclic mechanism 24 is operatively interposed between the variable speed drive 38 and the cutting blade support 12. The purpose of the cyclic mechanism 24 is to decelerate and accelerate the cutting blade so that it makes one revolution between cuts and is moving at web speed at the instant of cut. The cyclic mechanism 24 is associated with a guide block 54 which provides for the speed adjustment of the cyclic mechanism 24.

There is a definite setting of the cyclic mechanism 24 for each setting of the variable speed drive 38. These settings are effected simultaneously and synchronously by motor 44. Motor 44 has an output shaft 46 connected to a shaft 48 by a worm reducer 49. Shaft 48 is connected to an adjustment shaft 52 by way of an endless member such as chain 50 extending around sprockets on the shafts. Rotation of shaft 52, which is accomplished by selective operation of motor 44, moves the guide block 54 in one direction to effect cutting of shorter lengths of sheets or in an opposite direction to increase the length of the sheets. The manner in which movement of block 54 effects the cyclic mechanism 24 and the length of the sheet cut is spelled out in greater detail in said U.S. Pat. No. 3,745,865.

The chain 50 is also coupled to a shaft 56 containing an indicating pointer 58 movable along an indicator 60. The position of pointer 58 indicates the length of sheet being cut by the blades 16 and 18.

The shaft 48 is also coupled by means of beveled gears to a transverse shaft 62. Shaft 62 is connected to a shaft 64 by an endless member such as chain 66 extending around sprockets on the respective shafts. Shaft 64 is connected to a worm 68 meshed with a worm wheel 70. Worm wheel 70 adjusts the rotative disposition of cam 72 which in turn directly adjusts the relative position of the sets of discs in a known manner to increase or decrease the output speed from the drive 38.

Except for the details of the transmission 34, to be described hereinafter, all of the above is conventional and/or known to those skilled in the art. A substantial number of cutoff mechanisms, except for the presence of transmission 34, are presently used in the paperboard industry for cutting a web of paperboard into sheet lengths ranging from about 24 inches to about 240 inches. The transmission 34 facilitates extending the maximum sheet length of such cutoff mechanisms to about 480 inches by selectively introducing a cyclic driving speed to the main drive shaft 30 so that the cyclic mechanism 24 receives a cyclic input speed instead of a uniform input speed.

Figure 2:
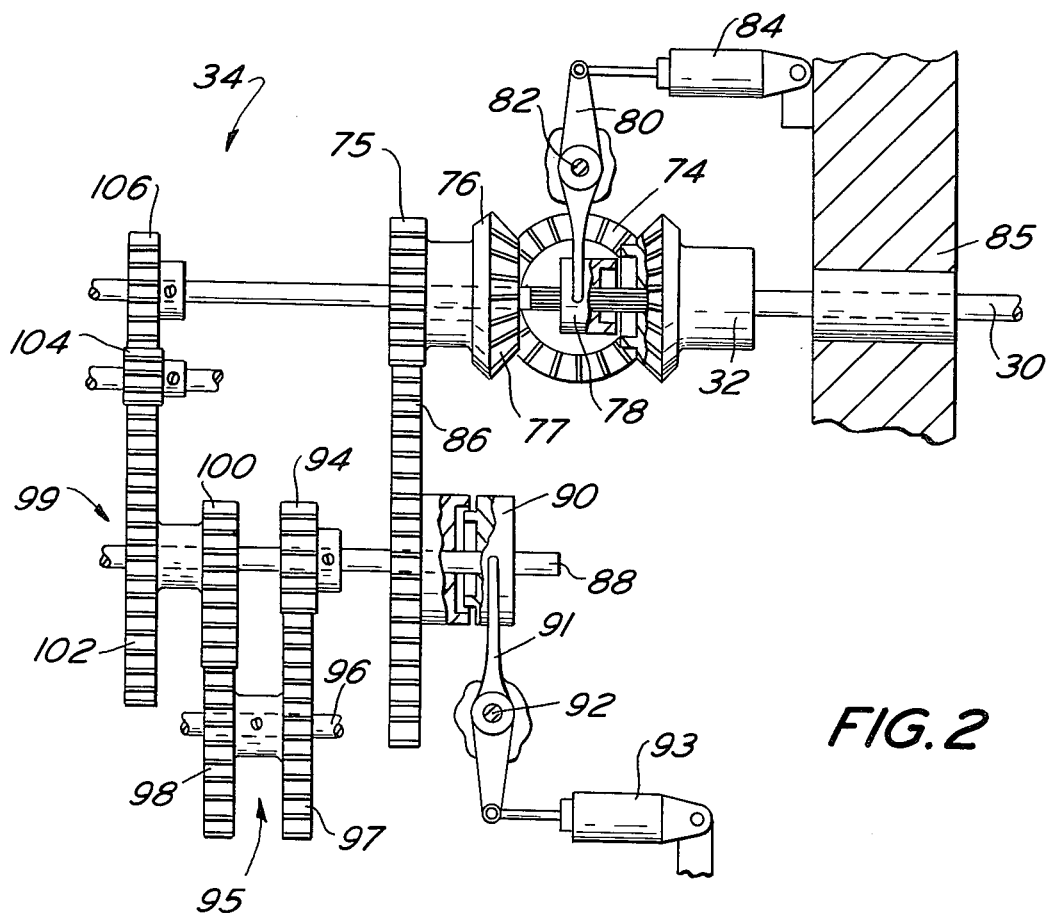
FIG. 2 is a sectional view taken along the line 2—2 in FIG. 1.

Referring to FIG. 2, the bevel gear 74 on the output shaft 36 of the drive 38 meshes with bevel gears 32 and 76. Each of the gears 32 and 76 is free wheeling on the main drive shaft 30. A clutch 78 is keyed or otherwise pinned to the main drive shaft 30 and movable in an axial direction so as to couple gear 32 to drive the main drive shaft 30 at a uniform base speed corresponding to the output from drive 38. For purpose of illustration, it will be assumed that the base speed of main drive shaft 30 is 5.23 revolutions per revolution of the knife blade supports 12 and 14, with the web speed being 400 feet per minute.

The clutch 78 is movable in an axial direction in any convenient manner such as by a yoke coupled to lever arm 80 pivotable about pin 82. Manipulation of lever arm 80 may be attained in any convenient manner such as by air cylinder 84 which is pivotably connected at one end to a support frame 85 along one side of the cutoff mechanism 10.

Thus, the clutch 78 facilitates the selective coupling of free wheeling gear 32 to the main drive shaft 30. The bevel gear 74 is also meshed with the gear 76. Gear 76 includes a spur gear 75 and a bevel gear 77 identical to gear 32. Gear 75 meshes with gear 86 which is free wheeling on shaft 88. Thus, when gear 32 is driving shaft 30, gears 76 and 86 rotate. Gear 86 is selectively coupled to the shaft 88 by means of clutch 90. Clutch 90 is associated with shaft 88 in the same manner as clutch 78 is associated with shaft 30. Thus, clutch 90 may move in an axial direction by means of lever arm 91 pivoting about pin 92. Manipulation of lever arm 91 may be attained by air cylinder 93. When clutch 90 is engaged with gear 86, shaft 88 rotates at the same speed as the shaft 30 due to the relative size of gears 75, 77 and 86.

A gear 94 is keyed, pinned or otherwise coupled to shaft 88 for rotation therewith. Gear 94 meshes with gear portion 97 of a cluster gear 95 mounted on shaft 96. Due to the sizes of gears 94, 97 shaft 96 rotates at one half the speed of shaft 30. Cluster gear 95 includes an elliptical gear 98 meshed with an elliptical gear 100. Gear 100 is a portion of the cluster gear 99. Cluster gear 99 is free wheeling on shaft 88 and includes a spur gear 102 meshed with idler gear 104 which serves only to reverse the direction of output from gear 102. Idler gear 104 is meshed with pinion 106 which is keyed, pinned or otherwise secured to the shaft 30.

The gear train described above from gear 76 to pinion 106 uses gears of a size whereby pinion 106 will rotate main drive shaft 30 at one half the base speed provided by gear 32 but with a cyclic velocity. When the cyclic velocity at one half the base speed is transmitted by shaft 30 to cyclic mechanism 24, twice the length of paperboard will pass the cutter blades 16 and 18 between each cut. Hence, the length of the sheet can be doubled merely by flipping a switch or pushing a button which is part of a simple circuit which disengages clutch 78 from gear 32 and simultaneously engages clutch 90 with gear 86.

At any particular web speed, the number of revolutions of the main drive shaft 30 per revolution of the blades 16, 18 must remain constant regardless whether the shaft 30 rotates at uniform speed or at a cyclic speed. Otherwise, the blades 16, 18 will not have the same speed as the web when the cut is made. Hence, it is not possible to double sheet length merely by decreasing the speed of shaft 30, 50 percent.

Figure 3:
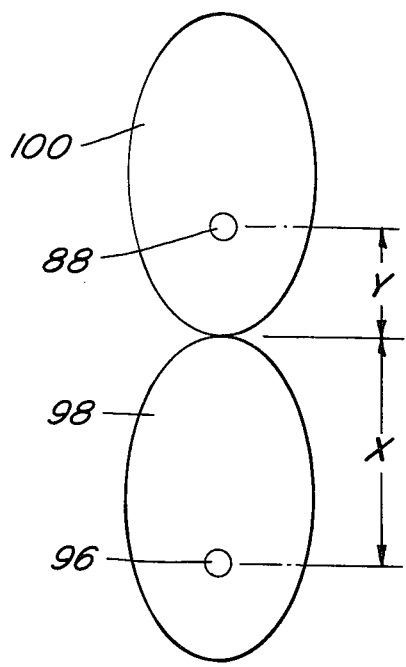
FIG. 3 is an elevation view of two elliptical gears on an enlarged scale.

In order to double the length of sheets to be cut, the velocity of gears 98, 100 is generated while gear 98 rotates at a speed which is one half the speed of the main drive shaft 30. In FIG. 3 the gears 98, 100 are shown in the position they occupy when the blades 16, 18 cut the web. It will be noted that the gears are identical in size. The fixed 1 to 2 ratio of gears 98, 100 is attained by the major lobe on gear 98 having a length X which is twice the length Y of the minor lobe on gear 100. Because of the cyclic velocity generated by elliptical gears 98, 100, shaft 30 can be driven at one half speed but at the same time will enable the blades 16, 18 to be driven at web speed at the instant the web is cut.

When it is desired to cut the sheets in a length up to 240 inches, it is only necessary to actuate motor 44 to position block 54 and adjust cam 72 in a known manner with the pointer 58 indicating the sheet length. It is assumed that clutch 78 is engaged. Any time it is desired to double the indicated sheet length, it is only necessary to disengage clutch 78 and engage clutch 90. If it is desired to adjust from a sheet length of about 40 inches to a sheet length of 100 inches, it is only necessary to adjust the position of block 54 and cam 72, in a conventional manner, up to a position corresponding to a 50 inch sheet. Thereafter, clutch 78 is disengaged and clutch 90 is engaged whereby the machine may immediately cut 100 inch length sheets. All adjustments are made while the machine is running and without stopping the web movement. While the adjustments are being made, a few improperly cut sheets may result depending upon the extent of the change in sheet length.

The cutoff mechanism 10, when built without the transmission 34, would take approximately 30 seconds to adjust from a set up to cut 40 inch sheets to a set up to cut 100 inch sheets. With the transmission 34, the changeover time is reduced to about 5 seconds.

In view of the above description, a more detailed explanation of operation is not deemed necessary. As will be apparent from the above, transmission 34 includes components such as gear 32 and clutch 78 for transmitting through drive shaft 30 to cyclic mechanism 24 a uniform base speed for cutting sheets having a length within a predetermined range such as 22 to 240 inches. Also, transmission 34 can transmit through drive shaft 30 to cyclic mechanism 24 a cyclic speed for cutting sheets having a length which is a whole number multiple of sheet lengths in said range. Transmission 34 includes components such as elliptical gears 98, 100 which generate said cyclic speed while rotating at a speed which is a fraction of the speed of said blades 16, 18. In the illustrated embodiment, the fraction is unity divided by said whole number, namely one half.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for cutting a continuously moving web into sheets comprising
   at least one continuously driven cutting blade,
   a support for said blade,
   a selectively adjustable cyclic mechanism connected to said blade support to cyclically drive said blade so that said blade is at web speed at the instant of cutting,
   a drive shaft coupled to said cyclic mechanism for driving the same,
   a variable speed drive for rotating said drive shaft at a selectively uniform base speed for cutting sheets having a length within a predetermined range,
   a cyclic speed transmission for rotating said drive shaft at a cyclic speed for cutting sheets having a length which is a whole number multiple of sheet lengths in said predetermined range,
   said cyclic speed transmission including components for generating said cyclic speed while moving at a speed which is a fraction of said uniform base speed of said drive shaft,
   said fraction being unity divided by said whole number, and
   clutch means for selectively connecting the output of said variable speed drive directly to said drive shaft and in the alternative indirectly to said drive shaft by way of said cyclic speed transmission.

2. Apparatus in accordance with claim 1 wherein said cyclic speed transmission includes a gear free wheeling on said drive shaft, and said clutch means including a clutch for selectively coupling said free wheeling gear to said main drive shaft.

3. Apparatus in accordance with claim 1 wherein the maximum length of sheets within said predetermined range is approximately 240 inches, and said whole number being two, whereby a continuously moving web may be cut into sheet lengths up to 480 inches.

4. Apparatus in accordance with claim 1 wherein said transmission includes elliptical gears in meshing engagement and geared to rotate at one half the speed of said blade.

5. Apparatus in accordance with claim 1 wherein said transmission components includes elliptical gears in meshing engagement and geared to rotate so that said fractional speed is one half the speed of said drive shaft, said elliptical gears being of the same size with one being a driving gear and the other being a driven gear, the major lobe on the driving gear meshing with the minor lobe on the driven gear when said blade is in its cutting position, and the major lobe of said driving gear being twice the length of the minor lobe on said driven gear.

\* \* \* \* \*